United States Patent Office 3,421,861
Patented Jan. 14, 1969

3,421,861
PROCESS FOR THE PREPARATION OF OZONATES AND COMPOSITIONS RESULTING THEREFROM
Andrew J. Kacmarek and Irvine J. Solomon, Chicago, Ill., assignors to IIT Research Institute, Chicago, Ill., a nonprofit corporation of Illinois
No Drawing. Application Mar. 7, 1960, Ser. No. 13,382, which is a continuation-in-part of applications Ser. No. 778,540, Dec. 5, 1958 and Ser. No. 817,435, May 28, 1959. Divided and this application Apr. 1, 1965, Ser. No. 444,841
U.S. Cl. 23—315          11 Claims
Int. Cl. C01b 13/00

ABSTRACT OF THE DISCLOSURE

A method for the production of ozonates by the reaction of alkali metal hydroxides and hydroperoxides and tetramethylammonium hydroxide with ozone in the presence of ammonia resulting in higher yields. Novel compositions resulting from this method included lithium ozonate tetraammoniate and sodium ozonate pentaammoniate.

---

This invention relates to a novel process for producing alkali metal and tetramethylammonium ozonates, and to a number of novel compositions of matter resulting therefrom.

The present application is a divisional application of Ser. No. 13,382 which in turn is a continuation-in-part of our applications U.S. Ser. No. 778,540 entitled "Lithium Ozonate and Process for Its Manufacture," filed Dec. 5, 1958, now abandoned, and U.S. Ser. No. 817,435 entitled, "Composition and Process for Its Manufacture," filed May 28, 1959, now abandoned.

The present invention is primarily based upon our discovery that ammonia, acting in part as a catalyst, and sometimes in part as a complexing agent, markedly increased the yield of the group of compounds comprising alkali metal ozonates and tetramethylammonium ozonate, when for example, the respective hydroxides thereof are subjected to an ozonization treatment. In fact, as is shown below, increased ozonate production of the order of approximately tenfold is readily accomplished by our process. We have also found that such increased yield results when the various alkali metal and tetramethylammonium hydroperoxides are ozonized in the presence of ammonia.

In addition to the considerable increase in yield of the various ozonates as herein provided, by our process we have likewise been able to make a number of novel and previously unobtainable alkali metal ozonates, including the compositions lithium ozonate tetraammoniate and sodium ozonate pentaammoniate.

Accordingly, a primary object of our invention is to provide a novel process for producing alkali metal and tetramethylammonium ozonates.

Another object of our invention is to provide novel compositions of matter, namely, lithium ozonate tetraammoniate and sodium ozonate pentaammoniate.

A more specific object of our invention is to provide a novel process of ozonizing alkali metal and tetramethylammonium hydroxides in the presence of ammonia whereby a considerable amount of reaction product is obtained.

Another more specific object of our invention is to provide a novel process for producing alkali metal and tetramethylammonium ozonate which comprises the ozonization of the respective hydroperoxides of such alkali metals and tetramethylammonium.

Another object of our invention is to provide a novel process of ozonizing alkali metal and tetramethylammonium hydroperoxides in the presence of ammonia whereby a considerable amount of reaction product is obtained.

These and other objects, features and advantages of our invention will become apparent to those skilled in this particular art from the following detailed disclosure thereof.

It is known to those chemists working in the ozonate field that all of the alkali metal ozonates, with the exception of lithium ozonate, have been produced and reported on to varying degrees by a number of researchers in the past. Such production has been primarily by the reaction between the respective alkali metal hydroxide and dilute gaseous ozone (i.e., about 3% ozone by volume in oxygen). For example, potassium ozonate has been prepared by the following reaction:

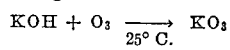

In such reaction the dilute ozone is bubbled through dry KOH powder. The yield has been quite small, apparently because simultaneously with the KO$_3$ formation, it is decomposing as follows:

Various attempts to prevent such decomposition by lowering the reaction temperature have not had the wished-for results; there is a drastic reduction in the formation reaction rate. In distinction to this, we have discovered that when a small amount of ammonia is added to the potassium hydroxide and this then ozonized, there results a tenfold increase in ozonate yield. Furthermore, not only is such increase brought about at room temperature, but additionally the reaction may be caused to occur at temperatures as low as −126° C. Similar improvements are found with the other alkali metal and tetramethylammonium hydroxides.

Before considering more of the operational aspects of our invention, the terms "ozonate" and "ozonide" should be noted. In the literature in this field, as for example, the paper by Whaley and Kleinberg, "A Contribution to the Chemistry of Alkali Metal Ozonates," appearing in 73 J. Am. Chem. Soc., 79–82 (January 1951), the terms are considered synonymous, and they are so used in the present specification. In a Russian paper, viz., Nikol'skiy et al. "Ozonides of Sodium, Rubidium and Cesium," 77 Doklady Akad., Nauk SSSR, 67–72 (1951), the "ozonide" term is employed. To be specific when the term "alkali metal ozonate" is used herein, we mean compounds such as NaO$_3$, KO$_3$, etc. Tetramethylammonium ozonate has the chemical formula N(CH$_3$)$_4$O$_3$. The two ammonia complexes resulting from our process are characterized by the following formulae:

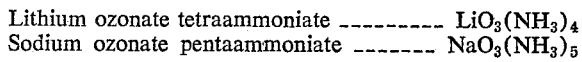

Another interesting aspect of the prior art which assists in the better understanding of our use of ammonia discovery is brought out in the aforereferenced Russian paper. These workers made the ozonides of sodium, rubidium and cesium by reacting their respective hydroxides with ozone, the reactions being carried out at temperatures ranging from −30° to −60° C. Contrary to their success in making these three ozonates, they state that from a theoretical standpoint, it is impossible to make lithium ozonide by a LiOH+O$_3$ reaction. Despite this, we have been able to conveniently produce the complex

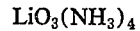

by ozonizing the hydroxide in the presence of trace amounts of ammonia. We obtain the same result with lithium hydroperoxide. Furthermore, we are able to make lithium ozonate per se, in small quantities by directly ozonizing LiOOH without using the ammonia. All of this is set out in greater detail below.

The ozone, as preferably used in the practice of our process, is in the form of what is termed "dilute gaseous ozone." By this is meant a concentration of from 1% to 10% by volume of ozone in a diluting gas such as oxygen or air or other gaseous carriers which are non-reactive with either the reactants or the ozonate compounds resulting from the present reactions. It should be understood that any concentration up to pure ozone may be used herewith, but since standard ozone generators are commercially available—such as the Wellsback generator—which produce ozone in concentrations of from 3% to 6% by volume in oxygen, such dilute concentrations represent the preferred concentrations for use herewith. Not only are such concentrations readily available, but by the use of dilute ozone, the precautionary measures and problems involved in utilizing pure ozones are considerably lessened. The dilute gaseous ozone is bubbled or passed through the hydroxide powder, for example in practicing the present process and in yielding the instant novel compositions of matter.

Before considering the operational details of our process, the term "trace amounts" as used herein with respect to the amount of ammonia should be noted. Such term is widely used in the chemical arts and will be immediately evident to those skilled therein. Most preferably, the amount of ammonia employed is limited to that which can readily be absorbed upon the hydroxide or hydroperoxide being ozonized. Too little reduces the ozonate yield whereas, on the other hand, under low temperature conditions particularly, the excess $NH_3$ will react with ozone to form ammonium ozonate. In other words, while an excess of ammonia can be used, since the ammonia itself can be ozonized, as set out in the pending application, Ser. No. 709,423, filed Jan. 16, 1958, the unneeded ammonia produces an unnecessary separation problem in producing the ozonates of the present invention. Thus, at temperatures around the freezing point of ammonia, if an excess thereof is employed, the following may occur:

$$KOH + O_3 \xrightarrow{\text{excess } NH_3} KO_3 + NH_4O_3$$

From the foregoing it may be seen that while our process may be practiced with excess ammonia, such a technique not only is wasteful, but further causes additional separatory steps in segregating the alkali metal from the ammonium product. In one practical embodiment of our invention, we have determined that approximately 10 millimoles of ammonia (about 0.17 gram) is the preferred quantitative amount to use in reacting with about 15 grams of lithium hydroxide. Even smaller quantities of ammonia can be used, but this will reduce the net yield and the efficiency of the reaction. Thus, as a practical criteria, the optimum amount of ammonia to use is that quantity which can be absorbed by the hydroxide in the reaction, and by this is meant "trace amount."

Referring next to the details of our invention:

As noted above, the alkali metal hydroperoxides may be directly ozonized as follows:

$$M^+OOH^- + O_3 \rightarrow MO_3$$

where $M^+$ is an alkali metal, including the class lithium, sodium, potassium, rubidium and cesium. For purposes of the present disclosure tetramethylammonium hydroperoxide, since it also may be so treated, is included within such process.

One specific example of this is illustrated by the ozonization of lithium hydroperoxide to form lithium ozonate:

$$LiOOH + O_3 \rightarrow LiO_3$$

This reaction is carried out by passing dilute gaseous ozone through lithium hydroperoxide crystals while maintaining the reactor vessel at temperatures between $-78°$ and $-112°$ C., or below. Under such conditions the ozonate forms on the surface of the hydroperoxide and is separated therefrom in a like manner as is set out in detail below for the hydroxide separation. It should be noted, however, that the ozonate yield of such process is quite low—approximately 0.04% of the LiOOH is thus converted.

The yield is increased by reacting the hydroperoxide with ozone in the presence of ammonia. In the case of two of the metals, viz., lithium and sodium, there results an ammoniate complex, whereas with potassium, rubidium, cesium and tetramethylammonium such a complex does not form. Thus:

$$MOOH + O_3 \xrightarrow{NH_3} MO_3(NH_3)_x$$

where $M = Li^+$ or $Na^+$; and $x = 4$ when $M = Li$ and 5 when $M = Na$.

All of the various above-named hydroperoxides are ozonized as set out above; that is, at temperatures below $-78°$ C. Hydroperoxide crystals are positioned in a reactor vessel having two openings—to permit ingress and egress of the dilute ozone—and a trace amount of ammonia is absorbed upon the crystals. The ozone is passed through the crystals to yield the ozonate. The ammonia effect is quite remarkable: in one run we subjected crystalline lithium hydroperoxide held at about $-112°$ C. to dilute gaseous ozone to produce only a 0.04% yield of lithium ozonate. On the other hand, with the presence of trace ammonia, under the same conditions the yield was 1.3% of the lithium ozonate complex.

The hydroperoxide process, with or without ammonia is not the preferred method of our invention. Some of the hydroperoxides are not commercially available, and whether they are made in the laboratory or purchased, the expense, particularly when compared with the cost of the comparable hydroxides, is quite high. For a method of producing the hydroperoxides the reader is referred to the book "Inorganic Synthesis," vol. V, pp. 1–3 by A. J. Cohen, McGraw-Hill, 1957.

Our preferred method is to ozonize the various alkali metal and tetramethylammonium hydroxides in the presence of ammonia. As set out aforesaid, the quantity of ammonia is preferably limited to that which is readily absorbed upon the hydroxide crystals being ozonized.

We have confirmed the theoretical findings of the authors of the Russian paper cited above in that it has proven impossible to merely ozonize lithium hydroxide. For some not fully understood reasons, such hydroxide is not amenable to ozonization lacking the presence of ammonia. We succeeded in making the ozonate complex, however, by the following process:

We placed 2.5 grams of crystalline LiOH upon a non-reactive filter medium and then added trace quantities of ammonia to such hydroxide. This latter addition may be most readily accomplished by first saturating the lithium hydroxide with liquid ammonia and then evaporating excess ammonia to leave only a trace amount adherent thereto. In still another technique, we condensed liquid ammonia at $-78°$ C. in trace quantities onto the lithium hydroxide. Since lithium hydroxide is insoluble in liquid ammonia, a considerable excess of ammonia is of little importance so long as there persists and adequate trace to enhance the ozonization reaction and a sufficient amount to react to form the tetraammoniate complex. The $NH_3$-treated hydroxide as positioned upon the filter was placed in a tubular container open at both ends for the entrance and exit of the dilute gaseous ozone and such reactor in turn was surrounded within a cold bath in order to maintain the operating temperature during ozonization between $-33°$ C. to $-112°$ C., it being preferred that a temperature range below $-63°$ C. be utilized. One example of a cooling bath that we employed was a carbon di-sulfide slush bath cooled to the required operating temperature by subjecting it to liquid nitrogen. For purposes of example, we performed the ozonization reaction at a temperature of $-112°$ C. Dilute gaseous ozone was passed through the lithium hydroxide at a flow rate of approximately 55 cc. per minute for 10 minutes. Under these test conditions, 3.9 millimoles of lithium ozonate tetraammoniate was produce or a 4% yield based upon the amount of lithium hydroxide originally used in the reactive process.

The lithium ozonate tetraammoniate forms on the surface of the lithium hydroxide particles just as in the case of lithium ozonate formation upon the hydroperoxide and after the extraction of the ozonate, the hydroxide may be recycled and reused subsequently in the process. The next step after the formation of the lithium ozonate complex is its separation or extraction from the lithium hydroxide carrier. In our preferred extraction procedure we make use of the aforementioned fact that lithium hydroxide is insoluble in liquid ammonia, whereas, the lithium ozonate tetraammoniate complex is soluble therein. Thus, in the first step of our extraction procedure we pass liquid ammonia at approximately 63° C. through the lithium ozonate tetraammoniate-lithium hydroxide mass to dissolve the ozonate while leaving the hydroxide as a residue upon the filter medium. In order to separate pure lithium ozonate complex from the ammonia solvent, we next make use of a co-solvent procedure, preferably using a solvent, such as Freon 23 to precipitate out the tetraammoniate. Since lithium ozonate tetraammoniate is insoluble in Freon 23, whereas ammonia is soluble therein, as the relative amount of Freon is increased by adding it to the ammonia-lithium ozonate tetraammoniate solution, the ozonate precipitates out at upon continued addition of the Freon and substantally all of the ozonate may be filtered from the solution. It should be recognized that instead of Freon 23, other solvents may be utilized in such co-solvent procedure. Such solvents are characterized by their ability to dissolve ammonia, but not $Li(NH_3)_4O_3$ and do not react with the latter.

The ozonates may be separated from the hydroperoxides in the same manner as aforesaid.

Turning next to sodium ozonate, it is seen from the prior art that such compound has been made by the ozonization of sodium hydroxde, but the yields have been exceedingly small and, as a result, it has not been fully characterized. We have found that a trace quantity of ammonia, absorbed upon sodium hydroxide crystals, markedly increases the sodium ozonate yield, in much the same manner as with lithium ozonate. However, in the presence of ammonia, upon ozonization with dilute gaseous ozone, there results the complex compound, sodium ozonate pentaammoniate—$NaO_3(NH_3)_5$. Examples of such process, and the results thereof are set out in Table 1 below, particular reference at this point being directed to the tests or runs numbered 3–A and 4–A therein. The reaction temperature was −78° C., as is the temperature for all experimental results presented in such table wherein ammonia was not used. This is optimum without ammonia. In the presence of ammonia reaction the sodium ozonate pentaammoniate resulting from the process was separated from the unreacted sodium hydroxide in the same manner as the lithium ozonate complex was separated as indicated above.

Similar increased yields were produced in reacting potassium hydroxide with dilute gaseous ozone in the presence of ammonia. The results are set out also in Table 1 and the separatory process is the same as that used in making the lithium ozonate. However, we found that the potassium ozonate does not complex with ammonia, a phenomena which was likewise found with rubidium, cesium and tetraammonium ozonate. Apparently the smaller atoms of lithium and sodium are able to form such complex with ammonia, whereas the larger alkali metal atoms or the large organic molecule tetramethylammonium ozonate cannot so do.

The markedly increased yields produced when employing the ammonia catalyst is shown in the following table:

TABLE 1.—THE EFFECT OF AMMONIA ON THE PREPARATION OF OZONATES

| Run | $NH_3$ used, ml. | $O_3$ used, moles* | Time, min. | Reactant, g. | Ozonate formed, g. | Based on hydroxide | Based on ozone |
|---|---|---|---|---|---|---|---|
| 1–A | 1 | 0.03 | 15 | 28 KOH | 0.226 | 0.5 | 8.3 |
| 1–B | 0 | 0.03 | 15 | 28 KOH | 0.013 | 0.03 | 0.5 |
| 2–A | 1 | 0.03 | 13 | 28 KOH | 0.231 | 0.54 | 9.0 |
| 2–B | 0 | 0.03 | 13 | 28 KOH | 0.017 | 0.04 | 0.63 |
| 3–A | 1 | 0.03 | 18 | 20 NaOH | 0.312 | 1.56 | 26.0 |
| 3–B | 0 | 0.03 | 18 | 20 NaOH | 0.0008 | 0.004 | 0.07 |
| 4–A | 1 | 0.03 | 19 | 20 NaOH | 0.29 | 1.48 | 24.7 |
| 4–B | 0 | 0.03 | 19 | 20 NaOH | 0.0014 | 0.007 | 0.12 |
| 5–A | 1 | 0.006 | 16 | 1.5 $(CH_3)_4NOH$ | 0.217 | 10.4 | 28.3 |
| 5–B | 0 | 0.006 | 16 | 1.5 $(CH_3)_4NOH$ | 0.0366 | 1.84 | 5.0 |
| 6–A | 1 | 0.006 | 14 | 1.5 $(CH_3)_4NOH$ | 0.203 | 9.73 | 26.5 |
| 6–B | 0 | 0.006 | 14 | 1.5 $(CH_3)_4NOH$ | 0.0299 | 1.50 | 4.1 |

Since sodium ozonate has been quite difficult to prepare, and to our knowledge, its pentaammoniate complex has never been prepared prior to our production thereof, such compositions have never been fully characterized. This is likewise true of lithium ozonate tetraammoniate. To assure those skilled in this art that such ozonates result from the process as herein taught, in Tables 2 and 3 are Ultraviolet Spectra data of these and related compounds. This is a reliable procedure for the identification of ozonates.

In Table 2, dimethyl formamide is the solvent; in Table 3—liquid ammonia.

TABLE 2.—ULTRAVIOLET SPECTRA IN DIMETHYL FORMAMIDE

| Ozonate | Absorption peak, millimicrons | | | | |
|---|---|---|---|---|---|
| $NaO_3(NH_3)_5$ | 428 | 444 | 452 | 476 | 583 |
| $RbO_3$ | 427 | 443 | 454 | 472 | 487 |
| $CsO_3$ | 428 | 443 | 457 | 473 | 491 |
| $(CH_3)_4NO_3$ | 428 | 443 | 455 | 472 | 488 |
| $KO_3$ | 429 | 445 | 452 | 477 | 490 |

TABLE 3.—ULTRAVIOLET SPECTRA IN LIQUID AMMONIA

| Ozonate | Absorption peak, millimicrons | | | | | |
|---|---|---|---|---|---|---|
| $KO_3$ | 423 | 438 | 451 | 465 | | 486 |
| $CsO_3$ | 420 | | 450 | 472 | | 490 |
| $(CH_3)_4NO_3$ | 421 | 434 | 449 | 466 | 478 | 486 |
| $Li(NH_3)_4O_3$ (from LiOOH) | 421 | 434 | 450 | 467 | | 486 |
| $Li(NH_3)_4O_3$ (from LiOH) | 421 | 435 | 451 | 460 | | 483 |

The ozonates and ammonia complex ozonates produced in accord herewith are red crystalline solid materials that are useful not only as oxidizing agents due to the ease with which the oxygen content thereof is liberated, but also, particularly the lithium complex, when used in combination with liquid ammonia, provides an excellent liquid monopropellant rocket fuel composition.

The resulting ozonate compounds become more stable, particularly to increasing temperatures as atomic number and molecular weights are increased. Thus, the lithium ozonate tetraammoniate is the least stable of the series whereas tetramethylammonium ozonate is quite stable even at room temperature. The stability of the lithium ozonate tetraammoniate in liquid ammonia is shown in the following table:

TABLE 4

| Time, hrs. | 30° C. | −63° C. | −78° C. |
|---|---|---|---|
| 20 | 21 | 9 | 0.7 |
| 40 | 41 | 17 | 1.1 |
| 60 | 58 | | 1.5 |

In addition to its uses as a compound per se as above indicated the lithium ozonate and the complex may be combined with liquid ammonia to provide a rocket monopropellant compound. Such propellant features result from the following equation:

$$LiO_3 + NH_3 \rightarrow LiOH + H_2O + LiNO_3$$

upon ignition of the lithium ozonate-ammonia mixture.

Stoichiometrically speaking for the foregoing monopropellant 1 molecule of lithium ozonate plus 4 molecules of ammonia are used. If we assume the exhaust temperature of the system to be 3780° F. at a calculated chamber pressure of 300 p.s.i.a. the specific impulse is 238 seconds whereas under the same conditions except for a chamber pressure of 1000 p.s.i.a. the specific impulse is 250 seconds.

In order to determine the chemical composition of the ammonia coordinated lithium ozonate complex a series of experiments were carried out wherein the amounts of $NH_3$ and $O_2$ were monitored during the decomposition of the compounds. The sample was prepared from LiOH and precipitated as set out hereinabove. Since the sample was precipitated with Freon 23, $CF_3H$, it was expected that some of the $CF_3H$ would remain with the solid, and to overcome this minor contamination use was made of the fact that $CF_3H$ is more volatile than $NH_3$; the former was removed by distillation at −126° C. Following this, the sample was maintained at −78° C. and the $NH_3$ was distilled off therefrom. It was observed that a large amount of $NH_3$ was removed in a very short time and it was assumed that such $NH_3$ was merely absorbed rather than coordinated. The remaining $NH_3$ was then distilled away at a slow steady rate, and then the temperature of the compound was slowly raised to room temperature while the release of $NH_3$ and $O_2$ was continuously monitored. After reaching room temperature the sample was dissolved in water and analyzed for $Li^+$, $NO_3^-$, and $NO_2^-$.

From the amounts of $NH_3$, $O_2$, $NO_3^-$ and $Li^+$ the empirical formula of two samples was calculated as $LiN_{4.16}H_{12.48}O_{3.01}$ and $LiN_{4.32}H_{12.93}O_{3.29}$, and from these values the true formula of $LiN_4H_{12}O_3$ or $Li(NH_3)_4O_3$ was deduced.

It will be understood that variations and modifications may be effected without departing from the spirit or scope of the novel concepts of the present invention.

We claim as our invention:

1. A compound, sodium ozonate pentaammoniate having the formula $NaO_3(NH_3)_5$.

2. A compound, lithium ozonate tetraammoniate having the formula $LiO_3(NH_3)_4$.

3. The method of producing a composition selected from the group consisting of alkali metal ozonates and tetramethylammonium ozonate which comprises the steps of reacting a composition selected from the group consisting of alkali metal and tetramethylammonium hydroperoxides with ozone and separating the ozonate thus produced from the initial reactants.

4. The method of producing a chemical composition selected from the group consisting of lithium ozonate tetraammoniate, sodium ozonate pentaammoniate, potassium ozonate, rubidium ozonate, and tetramethylammonium ozonate comprising the steps of reacting a composition selected from the group consisting of the hydroperoxides of lithium, sodium, potassium, rubidium, cesium and tetramethylammonium with ozone in the presence of ammonia and separating the ozonate thus produced from the initial reactants.

5. The method of producing a chemical composition selected from the group consisting of lithium ozonate tetraammoniate, sodium ozonate pentaammoniate, potassium ozonate, rubidium ozonate and tetramethylammonium ozonate comprising the steps of reacting a composition selected from the group consisting of the hydroxides of lithium, sodium, potassium, rubidium, cesium and tetramethylammonium with ozone in the presence of ammonia, and separating the ozonate thus produced from the initial reactants.

6. The method of producing a chemical composition selected from the group consisting of lithium ozonate tetraammoniate, sodium ozonate pentaammoniate, potassium ozonate, rubidium ozonate, cesium ozonate and tetramethylammonium ozonate comprising the steps of reacting a composition selected from the group consisting of the hydroxides and hydroperoxides of lithium, sodium, potassium, rubidium, cesium and tetramethylammonium with dilute gaseous ozone in the presence of ammonia and separating the ozonate thus produced from the initial reactants.

7. The method of producing a chemical composition selected from the group consisting of lithium ozonate tetraammoniate, sodium ozonate, pentaammoniate, potassium ozonate, cesium ozonate, rubidium ozonate and tetramethylammonium ozonate comprising the steps of reacting a composition selected from the group consisting of the hydroxides of lithium, sodium, potassium, rubidium, cesium and tetramethylammonium with dilute gaseous ozone in the presence of ammonia and separating the ozonate thus produced from the initial reactants.

8. The method of producing lithium ozonate comprising the steps of reacting lithium hydroperoxide with dilute gaseous ozone at a reaction temperature between −78° and −112° C., and separating the lithium ozonate thus produced from the initial reactants.

9. The method of producing lithium ozonate tetraammoniate comprising the steps of reacting lithium hydroxide with dilute gaseous ozone at a reaction temperature between −33° and −112° C., in the presence of ammonia, and separating the lithium ozonate tetraammoniate thus produced from the initial reactants.

10. The method of producing lithium ozonate tetraammoniate comprising the steps of reacting lithium hydroperoxide with dilute gaseous ozone at a reaction temperature between −33° and −112° C., in the presence of ammonia, and separating the lithium ozonate tetraammoniate thus produced from the initial reactants.

11. The method of making sodium ozonate pentaammoniate comprising the steps of: reacting a compound selected from the group consisting of sodium hydroxide and sodium hydroperoxide with ozone in the presence of ammonia and separating the sodium ozonate pentaammoniate thus produced from the initial reactants.

References Cited

UNITED STATES PATENTS 2,951,869  9/1960  Solomon et al. _____ 23—84

OTHER REFERENCES

Mellor: Comprehensive Treatise on Inorganic and Theoretical Chemistry, vol. 1 (1922), p. 908, QD31M4.

OSCAR R. VERTIZ, Primary Examiner.

H. S. MILLER, Assistant Examiner.

U.S. Cl. X.R.

23—222